(12) United States Patent
Wheaton

(10) Patent No.: US 8,074,915 B2
(45) Date of Patent: Dec. 13, 2011

(54) CONTAINER WITH A GRINDER

(75) Inventor: Keely Eileen Wheaton, Chicago, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 36 days.

(21) Appl. No.: 12/346,926

(22) Filed: Dec. 31, 2008

(65) Prior Publication Data
US 2010/0163658 A1    Jul. 1, 2010

(51) Int. Cl.
*A47J 42/00* (2006.01)
*B02C 17/00* (2006.01)
(52) U.S. Cl. ..................... 241/168; 241/169.1
(58) Field of Classification Search .................. 241/168, 241/169.1, 101.8, 258
See application file for complete search history.

(56) References Cited

U.S. PATENT DOCUMENTS

| | | | |
|---|---|---|---|
| 1,588,552 A * | 6/1926 | Sprinkle | 222/142.7 |
| 2,535,913 A * | 12/1950 | Galvin et al. | 222/142.6 |
| 3,720,522 A | 3/1973 | Nakagami | |
| 3,720,523 A | 3/1973 | Nakagami | |
| 3,720,524 A | 3/1973 | Nakagami | |
| 4,319,614 A | 3/1982 | Boice | |
| 4,632,322 A | 12/1986 | Beilstein | |
| 4,925,150 A * | 5/1990 | Tedioli | 241/169.1 |
| 4,960,246 A | 10/1990 | Fohrman | |
| 5,651,506 A * | 7/1997 | Hockey | 241/169.1 |
| 6,247,661 B1 | 6/2001 | Chainani | |
| 6,561,447 B2 * | 5/2003 | Wu | 241/169.1 |
| 6,962,302 B2 * | 11/2005 | Cheng | 241/169.1 |
| 7,066,418 B2 * | 6/2006 | Ng | 241/169.1 |
| 7,380,737 B2 * | 6/2008 | Wang | 241/169.1 |
| 7,533,838 B2 * | 5/2009 | Kalogroulis et al. | 241/169.1 |
| 7,604,189 B2 * | 10/2009 | Wang | 241/169.1 |

* cited by examiner

*Primary Examiner* — Faye Francis
(74) *Attorney, Agent, or Firm* — Fitch, Even, Tabin & Flannery

(57) ABSTRACT

A container for holding an edible liquid has a storage chamber for holding the liquid. The storage chamber has at least one outlet. The container also has an ingredient chamber separate from the storage chamber and for holding a flavor enhancing ingredient. A grinder is provided to communicate with the ingredient chamber for grinding the flavor enhancing ingredient. The grinder has at least one opening for dispensing the flavor enhancing ingredient on the opposite side of the grinder from the ingredient chamber.

19 Claims, 12 Drawing Sheets

CONTAINER WITH A GRINDER

FIELD

Containers are disclosed that separately hold both a liquid and a flavor enhancing ingredient to be mixed with the liquid, and more particularly, containers are disclosed having a grinder to grind the flavor enhancing ingredient.

BACKGROUND

It can be desirable to enhance the flavor of certain foods with both a liquid condiment and another flavor enhancing ingredient, such as an herb or spice. For example, condiments such as olive oil, vinegar, or other salad dressings are often enhanced by an herb or spices such as pepper or pepper corn. The spices may be premixed into the liquid condiment according to predetermined recipes and provided in a bottle. Such a premix, however, does not provide the consumer with the opportunity to control the amount of spice in the liquid condiment to satisfy personal tastes. Further, the flavor enhancing ingredient may tend to settle toward the bottom of the bottle. This can require the bottle to be shallow to resuspend the flavor enhancing ingredient in the liquid prior to dispensing. However, the suspension may not be uniform which can cause the concentration of flavor to vary as the liquid is periodically dispensed.

At other times, it can be desirable to have the spice freshly ground when placing the spice onto food when the food is being prepared or is being served. A separate grinder can be used to hold the spice. The separate bottles that store the spices, however, can be small and easy to misplace or mistake for other spices. It is also inconvenient to have numerous separate bottles while cooking such that one bottle for the liquid must be lifted and used separately before lifting and using the spice grinder when both the liquid and the spice are placed on the same food. During the meal, the spice bottles may also occupy space on a dinner table that is needed for plates or other condiments.

SUMMARY

A container for holding a liquid is provided that also provides a separate chamber to hold a flavor enhancing ingredient for mixing with the liquid and a grinder for grinding the ingredient. This can be accomplished by moving the flavor enhancing ingredient from one side of the grinder to the other side of the grinder for dispensing the flavor enhancing ingredient while also dispensing the liquid. The grinder may be operated to dispense a selected amount of freshly ground ingredient to create a custom mixture. Such a combination advantageously solves the problem of having multiple containers, as only one container is needed. When the container holds edible items, preservatives may be advantageously eliminated since the ingredient is stored separately from the liquid, which can reduce the cost of the edible product.

In one aspect, the container may comprise a storage chamber for holding an edible liquid and at least one outlet for the storage chamber. An ingredient chamber, separate from the storage chamber, holds a flavor enhancing ingredient. A grinder communicates with the ingredient chamber for grinding the flavor enhancing ingredient and has at least one opening for dispensing the flavor enhancing ingredient. The ingredient is dispensed on the opposite side of the grinder from the ingredient chamber.

The grinder may define a bypass passage to convey the liquid from one side of the grinder to the opposite side of the grinder. The bypass passage is positioned so that the liquid avoids the grinder teeth that receive and grind the flavor enhancing ingredient. The liquid in contact with the ingredient may cause jamming of the grinder because the liquid can act as adhesive between ingredient particles, or the liquid can affect the taste of freshness of the flavor enhancing ingredient. The bypass passage may be positioned so that the part of the grinder holding the teeth can rotate to grind the flavor enhancing ingredients.

The liquid and the flavor enhancing ingredient may be dispensed from the container. In one aspect, the edible liquid and flavor enhancing ingredient are dispensed separately from the container. In yet another aspect, the edible liquid and the flavor enhancing ingredient are mixed within the container to dispense the liquid and the flavor enhancing ingredient together. Advantageously, the user can select the amount of freshly-ground flavor enhancing ingredient to place into the liquid to customize the taste of the mixture.

DETAILED DESCRIPTION OF THE DRAWINGS

A container is provided that holds a liquid, a flavor enhancing ingredient to be mixed with the liquid, and a grinder so that a selected amount of freshly ground ingredient may be placed in the liquid to create a customized mixture suited to personal taste. A chamber may be provided on the container to make the mixture as uniform as desired. The liquid is stored separate from the ingredients to limit jamming of the grinder and degrading of the taste or freshness of the ingredient caused by the liquid. The container also eliminates the need for multiple containers.

Figure 1:
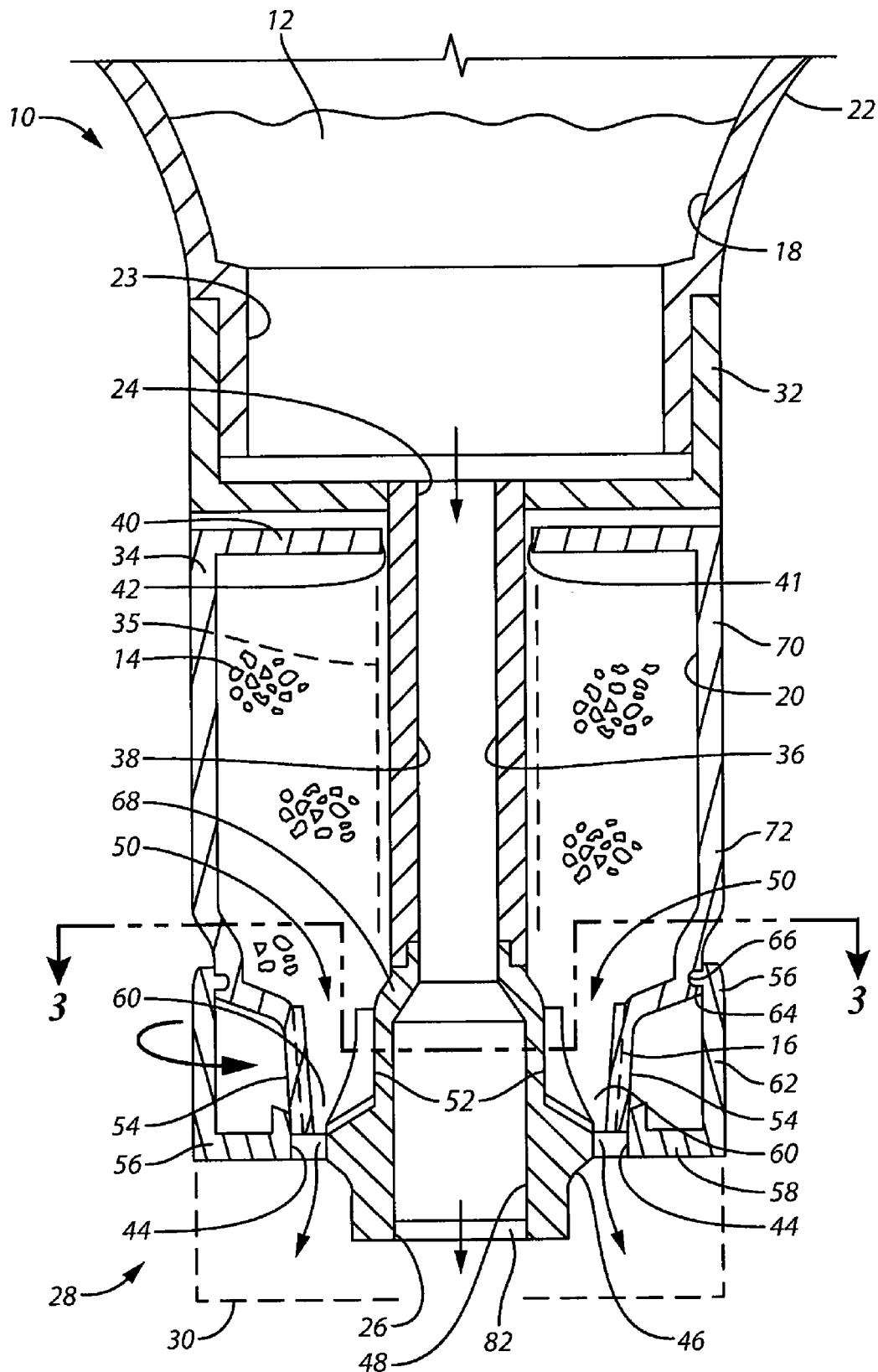
FIG. 1 is a side cross-sectional view of a dispensing end of a container and taken along the longitudinal axis of the container.
Figure 2:
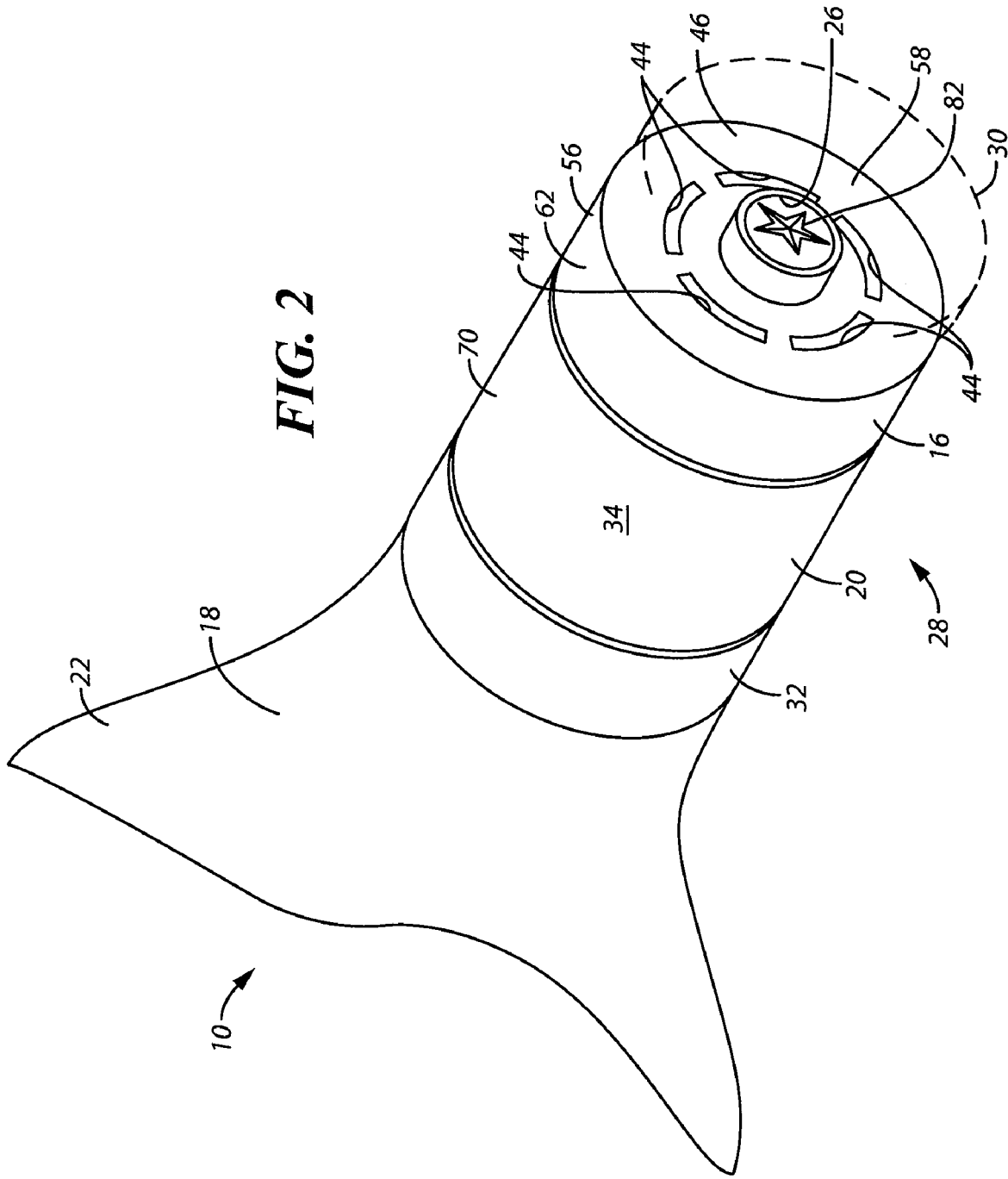
FIG. 2 is a perspective view of a dispensing end of the container of FIG. 1.
Figure 3:
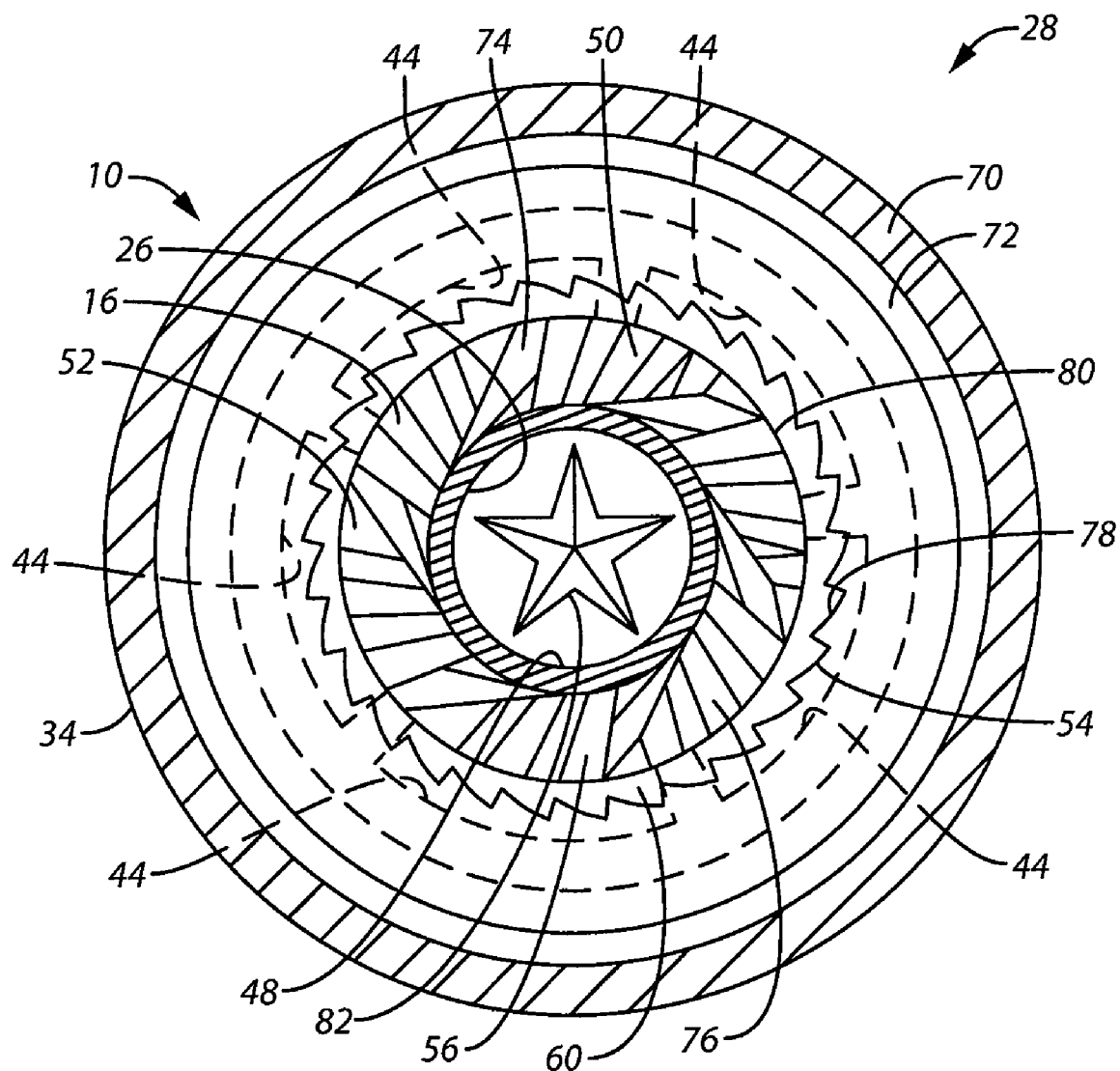
FIG. 3 is a transverse cross-sectional view of the dispensing end of the container of FIG. 1 taken along line III-III on FIG. 1.

Referring to FIGS. 1-3, a container 10 separately holds both an edible liquid 12 and a flavor enhancing ingredient 14.

The container 10 also has a grinder 16 to receive and grind the flavor enhancing ingredient 14 within the container 10. The user may advantageously create a custom mixture by selecting the amount of freshly ground flavor enhancing ingredient 14 to add to the liquid 12 simply by operating the grinder 16. The liquid 12 and flavor enhancing ingredient 14 may be dispensed separately from the container 10, or may alternatively be mixed within the container 10 before being dispensed as explained below. Since both the flavor enhancing ingredient 14 and liquid 12 are separately held on the same container 10, this solves the problems caused by multiple containers holding the edible liquid and multiple different spices.

The container 10 has a storage chamber 18 to hold the liquid 12, and an ingredient chamber 20 to hold the flavor enhancing ingredient 14. In one form, the liquid 12 is a salad dressing base for a particular type of salad dressing, such as ranch or Italian dressing, while the flavor enhancing ingredient 14 includes spices and/or herbs known to enhance that certain type of dressing. Normally, the flavor enhancing ingredients are dry ingredients. This could be a single spice or herb, or a combination of different spices and/or herbs. In an alternative form, the liquid 12 is a more basic or pure substance such as vinegar or olive oil for example, and the flavor enhancing ingredient 14 may be a known spice or herb, or combination thereof, that may be mixed into that substance, such as a pepper or peppercorn.

The container 10 has a widened, enclosed end portion 22 with an opening 23 that forms the storage chamber 18, and in one form, the container 10 is made of plastic although other materials, such as glass may be used. The storage chamber 18 has at least one outlet 24 that directs the liquid 12 to at least one container outlet 26 on a dispensing end portion 28 of the container 10 and that opens to the exterior of the container 10. A cover 30 (shown in dashed line) may swing, as by a hinge for example, to cover and uncover the container outlet 26. The enclosed end portion 22 may or may not form the base of the container 10 depending on whether or not the container is configured to balance stably upon the dispensing end portion 28. In either case, the container 10 is placed with the dispensing end portion 28 facing downward to pour as shown in FIG. 1 so that gravity aids in pouring both the liquid 12 and the ingredient 14.

The dispensing end portion 28 is attached to the enclosed end portion 22 to cover the opening 23 by a threaded cap 32 although it may be press fit, integrally formed, or welded with the enclosed end portion 22, or fixed by any other method to sufficiently fix the dispensing end portion 28 to the enclosed end portion 22. This may be a permanent connection or temporary for refilling of the liquid if desired. The cap 32 defines the storage chamber outlet 24 for directing the liquid through the dispensing end portion 28.

The ingredient chamber 20 is formed by a collar 34 disposed between the storage chamber 18 and the container outlet 26. At least one pathway 36 extends from the storage chamber outlet 24 toward the container outlet 26, while the collar 34, and in turn the ingredient chamber 20, is disposed around the pathway 36. More specifically, the collar 34 is disposed around a tube 38 that forms pathway 36 and that is fixed to the cap 32. The tube 38 and the cap 32 may be integrally formed or welded together or may simply be fixed together by a substantially liquid-tight friction fit.

Similarly, the collar 34 may be integrally formed or welded to the cap 32 so that there is a single wall separating the storage chamber 18 from the ingredient chamber 20. In the illustrated form, however, the ingredient chamber 20 has its own bottom (when the container 10 is standing upright) or distal wall 40 that is separate from the cap 32. The tube 38 extends through an aperture 42 on the distal wall 40. The distal wall 40, and in turn the collar 34, may have a tight friction fit with the tube 38, or may have a larger space 41 that permits the distal wall 40 to rotate about the tube 38. Such a space 41 need only be of sufficient size to maintain the unground flavor enhancing ingredient 14 within the ingredient chamber 20. It will also be understood, however, that when smaller unground ingredient particles are placed inside the collar 34, an interior, cylindrical wall 35 (shown in dashed line) may surround tube 38 and extend proximally from distal wall 40 to substantially enclose an annular, distal space within the collar 34 to form the ingredient chamber 20.

The grinder 16 communicates with the ingredient chamber 20 for grinding the flavor enhancing ingredient 14. The grinder 16 also has at least one opening 44 for dispensing the flavor enhancing ingredient 14 on an opposite or proximal side 46 of the grinder 16 from the ingredient chamber 20. The grinder 16 defines a bypass passage 48, communicating with pathway 36 and tube 38, for conveying the liquid 12 from one side of the grinder 16 to the opposite side 46 of the grinder without the liquid 12 engaging a grinding portion 50 of the grinder 16 that engages, cuts, and/or impacts the flavor enhancing ingredient 14 for grinding it.

More specifically, the grinder 16 has an inner portion or hub 52 that defines the bypass passage 48, and an outer portion 54 mounted at least partially around the inner portion 52. The flavor enhancing ingredient 14 is received between the inner and outer portions 52 and 54, which forms the grinding portion 50, for grinding the ingredient 14. This structure spaces the bypass portion 48 away from the grinding portion 50. So isolated, the liquid 12 is restricted from flowing into the grinding portion 50 and jamming the grinder 16 and/or affecting the taste and freshness of the ingredient 14.

The hub 52 is part of a main grinder member 56 with a plate section 58 extending radially outward from the hub 52 and defining the openings 44 radially outward from the bypass passage 48. The openings 44 also extend generally circumferentially underneath a space 60 between the inner and outer portions 52 and 54 through which the flavor enhancing ingredient 14 is received by the openings 44 to exit the grinder 16. While five openings 44 are provided here (FIG. 2), more or less openings may be provided as needed and as explained in greater detail below.

To further isolate the liquid 12 from the ingredient 14, the hub portion 52 extends proximally from the plate section 58 to space the container outlet 26 proximally from the openings 44. This structure further helps to maintain the liquid 12 away from the openings 44.

The main grinder member 56 also has an outer rim 62 that generally extends axially and distally from the plate section 58, and, in one form, remains exposed to the user for grasping and rotating the main grinder member 56, and in turn the hub 52. The outer rim 62 has an interiorly extending, annular lip 64 that is snap-fit into an annular groove 66 defined by the collar 34 so that the grinder 16 is axially secured on the container 10. The lip 64 and groove 66 are sized to permit the main grinder member 56 to rotate relative to the collar 34 for operation of the grinder 16.

Similarly, the hub 52 has an inlet end 68 that is axially fixed to the tube 38 while the hub 52 is still permitted to rotate relative to the tube 38. The hub 52 and tube 38 may be connected by a lip and groove connection as with the connection between the outer rim 62 and collar 34 already described. To load the ingredient chamber 20 in this case, the ingredient chamber 20 may be filled with the flavor enhancing ingredient 14 before the grinder 16 is mounted to the collar 34 and tube 38.

In an alternative, the hub 52 may be fixed both axially and rotatably with the tube 38 so that the pathway 36 and tube 38 rotate with the hub 52. In this case, tube 38 would be configured to rotate within cap 32. Here the distal wall 40 may be initially separate from collar 34 to load the ingredient chamber 20 with ingredient 14 before the wall 40, collar 34, and tube 38 are mounted on the cap 32. Otherwise, the tube 38 would need to be pushed through the flavor enhancing ingredient 14 in the collar 34 to mount the grinder 16 onto the collar 34.

The collar 34 has a main, generally cylindrical wall 70 and annular recessed portion or wall 72 extending inward from the wall 70. The recessed wall 72 defines the groove 66 so that the outer rim 62 may generally extend at the same radius as the collar 34. The recessed wall 72 extends further radially inward to the outer portion 54 of the grinder 16. The outer portion 54 is integrally formed with the collar 34 via the recessed portion 72.

Both the inner portion and outer portions 52 and 54 extend generally axially and face each other. The inner portion and outer portions 52 and 54 are also inclined to extend toward each other as the inner and outer portions 52 and 54 extend toward the openings 44 in a fully assembled state. The inner portion 52 has a circular array of blades 74 directing the flavor enhancing ingredient 14 to a circular array of inner teeth 76 that face a circular array of outer teeth 78 on the outer portion 54. In one form, the inner teeth 76 are generally positioned along an inner edge 80 of the opening 44 while the outer teeth 78 can be seen though the opening 44 with the space 60 for receiving the ingredient 14 defined between the inner and outer teeth 76 and 78.

In operation, the full container 10 may be inverted and the cover 30, if present, moved away from the container outlet 26. The liquid 12 may be poured by gravity alone. Otherwise, a valve 82 may be placed at container outlet 26 to limit liquid flow unless the storage chamber 18 is squeezed. Alternatively, both pressure on the storage chamber 18 and gravity may be required to pour the liquid. The gravity and/or external pressure will force the liquid through storage chamber outlet 24, pathway 36, bypass passage 48, and then out of container outlet 26.

Separately, unground ingredient 14 fills the space 60 between the inner and outer teeth 76 and 78. Rotating the outer rim 62 of the grinder 16 rotates the hub 52, and in turn, the inner teeth 76 relative to the outer teeth 78, which grinds the ingredient 14 forming ingredient particles sufficiently small to fit in, and fall through, openings 44. The user may need to hold the collar 34 steady with one hand while rotating the outer rim 62 if the outer portion 54, and in turn collar 34, have a tendency to rotate with outer rim 62 due to the ingredients 14 jamming the grinder or a tight fit between inner and outer portions 52 and 54 of the grinder 16. A user controls the amount of ingredient grinded and poured by selecting the number or portion of turns of the outer rim 62 of the grinder 16. It may be suggested to the user that a certain amount of turns, such as a single full turn of 360 degrees, will generally dispense a predetermined amount of flavor enhancing ingredient 14.

Also, it will be understood that the liquid 12 and ingredient 14 may be poured simultaneously. For instance, the user may have one hand tilting the container 10 and squeezing the storage chamber 18 while the other hand is rotating the grinder 16.

Since the liquid is dispensed separately, the user is able to control how much ingredient 14 is placed in the already poured liquid 12 to form a custom mixture suited to the user's taste. Also, since the flavor enhancing ingredient 14 is stored within the ingredient chamber 20 substantially separate from the liquid 12, certain preservatives previously used to preserve the flavor enhancing ingredient in the liquid may now be eliminated.

Figure 4:
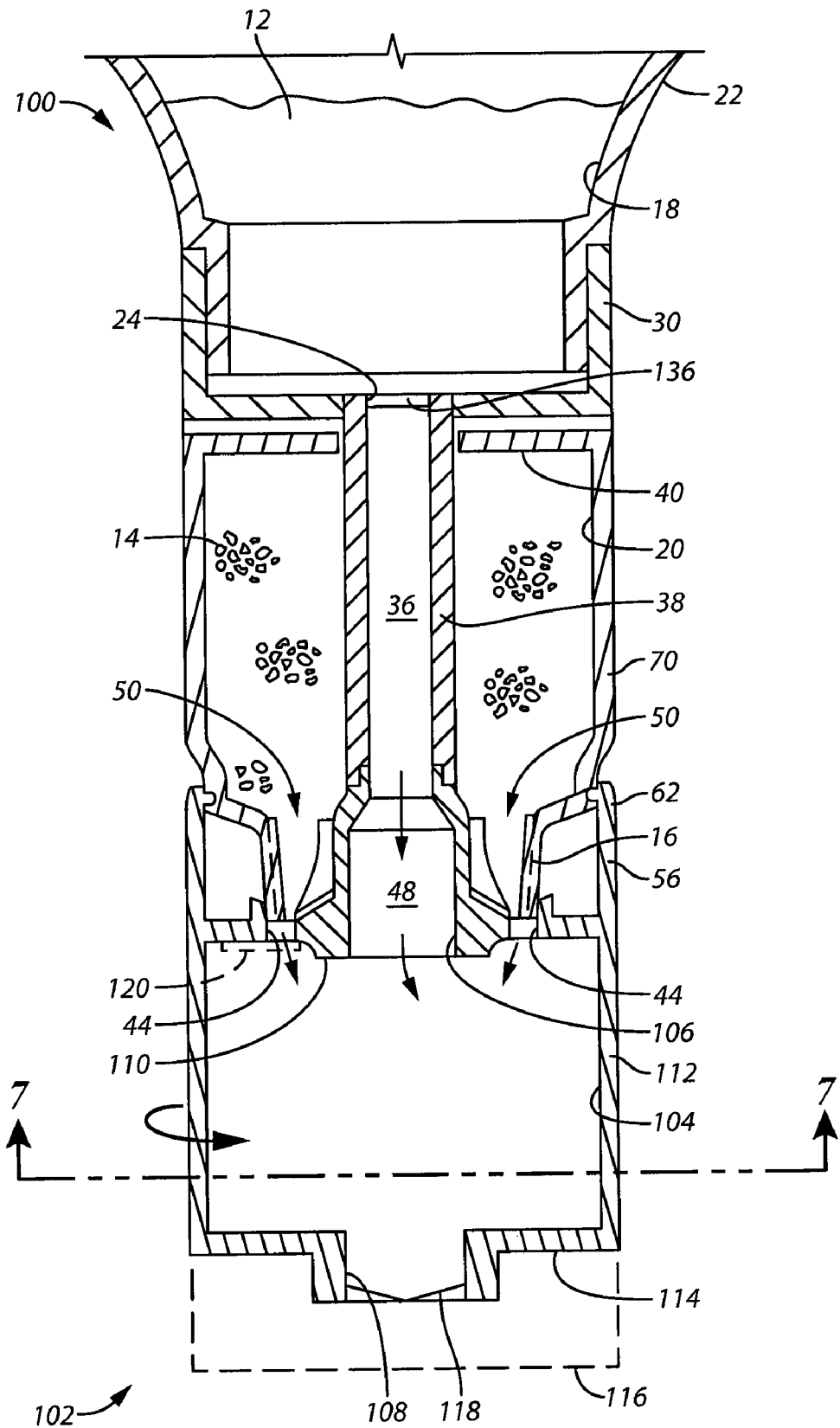
FIG. 4 is a side cross-sectional view of an alternative dispensing end for a container and taken along the longitudinal axis of the container.
Figure 5:
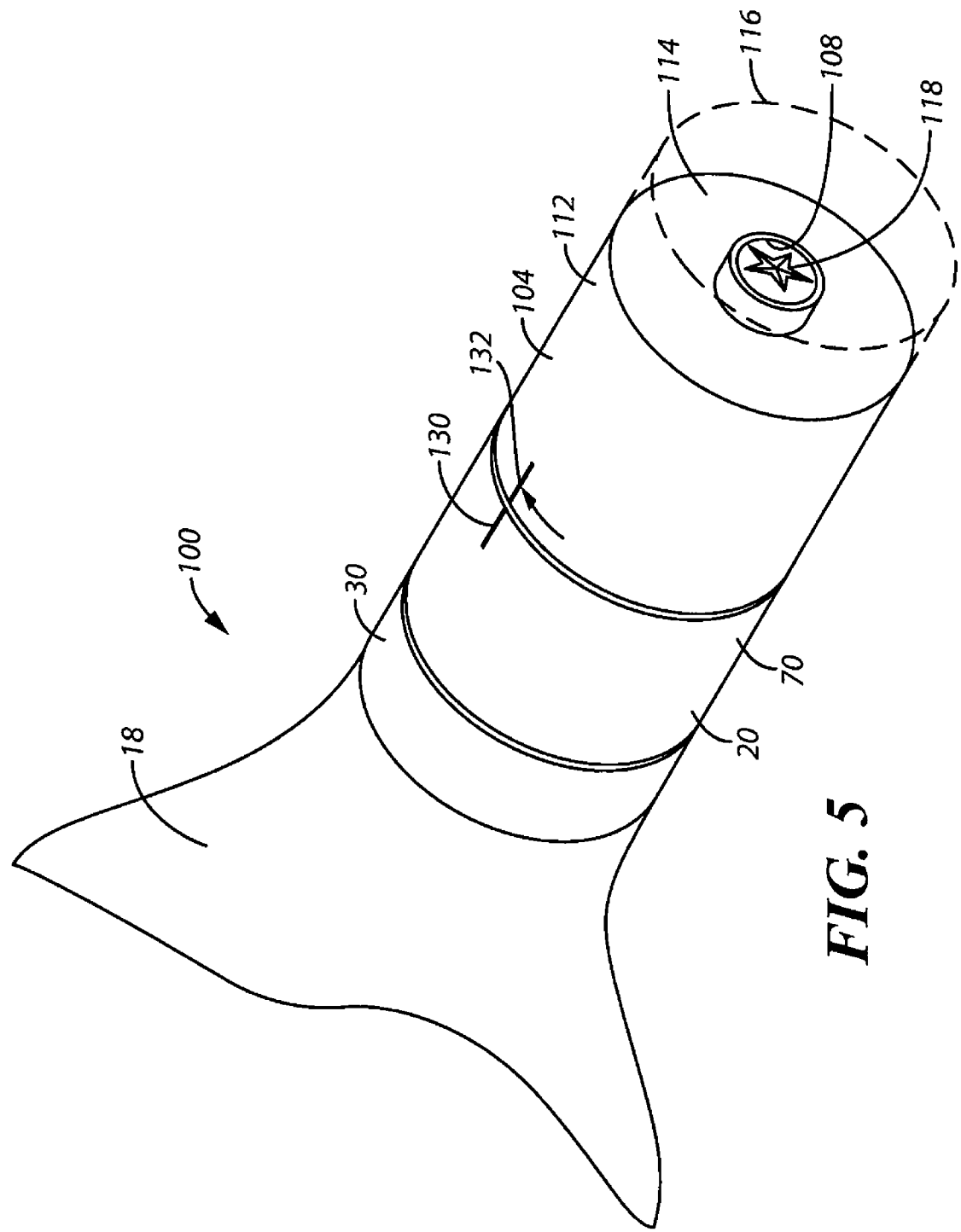
FIG. 5 is a perspective view of the dispensing end of FIG. 4.

Referring now to FIGS. 4-5, a container 100 has an alternative dispensing end portion 102. Many of the features of container 100 are similar to those of container 10. Those similar features need not be redescribed for container 100 and are numbered similarly as with container 10. In addition to grinder 16, storage chamber 18, and ingredient chamber 20 as described above, container 100 adds a mixing chamber 104 that receives both liquid 12 from an outlet 106 of the bypass passage 48 and the flavor enhancing ingredient 14 from the openings 44. This permits a selected amount of freshly ground flavor enhancing ingredient 14 to be placed in the mixing chamber 104 that is less than all of the flavor enhancing ingredients in the ingredient chamber to better control or customize the taste of the mixture.

The mixing chamber 104 has a mixing chamber outlet 108 for dispensing the mixed liquid and flavor enhancing ingredient. In the illustrated form, the grinder 16 is disposed on the opposite or distal side 110 of the mixing chamber 104 from the mixing chamber outlet 108. The mixing chamber 104 may be formed by a generally cylindrical extension wall 112 that extends axially and proximally from the outer rim 62 of the grinder 16. The extension wall 112 extends to an end wall 114. The end wall 114 defines the mixing chamber outlet 108 which, in one form, opens to the exterior of the container 100. Such a configuration rotatably and axially secures the mixing chamber 104 to the main grinder member 56 so that rotating the extension wall 112 operates the grinder 16. However, the mixing chamber 104 may be formed separately from the grinder 16 as long as it receives the liquid 12 and ground ingredient 14 from the grinder 16.

The mixing chamber 104 may dispense a more uniform mixture from the container 100 than may be achieved by dispensing the liquid 12 and flavor enhancing ingredient 14 from the container separately. Thus, in operation, the liquid 12 may be dispensed, and a selected amount of flavor enhancing ingredient 14 may be ground and dispensed, as explained above for container 10. Here, however, the liquid 12 and ingredient 14 are first dispensed into the mixing chamber 104 rather than separately to the exterior of the container. To control the amount of liquid 12 flowing to the mixing chamber 104, a valve 136, similar to valve 82, may be placed at the storage chamber outlet 24 or the bypass valve outlet 106 leading to the mixing chamber 104.

Before dispensing the mixture from the mixing chamber 104, the user may shake the container 100 until the mixture in the mixing chamber 104 appears to be a uniform or otherwise desired consistency. Such a uniform consistency may be determined to occur when the user can observe that the flavor enhancing ingredient is evenly spread out within the liquid in the mixing chamber 104. The mixing chamber 104 may be sufficiently transparent or translucent for this purpose. Once the mixture in the mixing chamber 104 appears to be uniform, a cover 116 (shown in dashed line) may be moved off of the mixing chamber outlet 108 to permit the mixture to pour out of the mixing chamber outlet 108. Alternatively, or additionally, the mixing chamber 104 may be squeezed to force the mixture through a valve 118 disposed at the mixing chamber outlet 108 that limits unintentional release of the mixture.

The dispensing end portion 102 is also provided with a backflow device 120 to restrict liquid 12 downstream of the openings 44 to the grinder 16, such as that in the mixing chamber 104, from entering the openings 44. This may occur when the container 100 is turned upright (wide-side down) or when the container 100 is being shaken to mix the contents of the mixing chamber 104. Liquid that enters the grinder 16 through openings 44 may jam the grinder.

Figure 6:
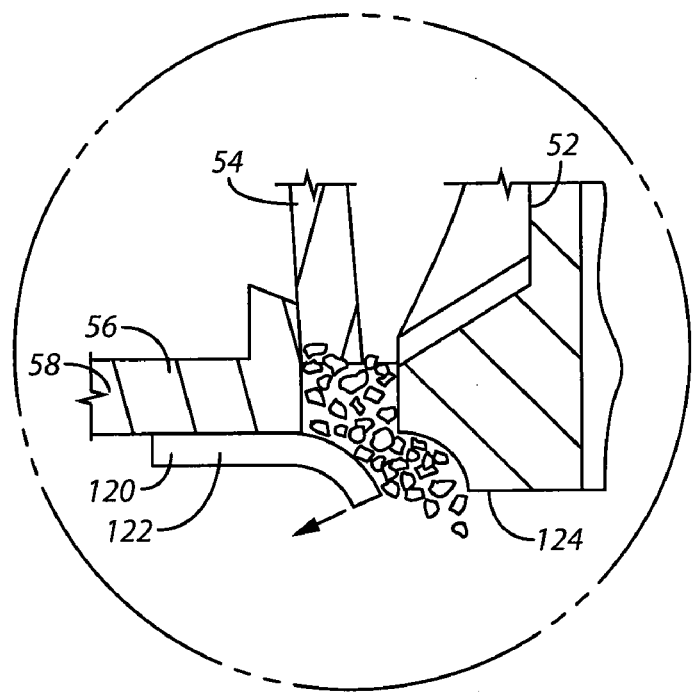
FIG. 6 is a close-up cross-sectional view of a portion of the dispensing end of FIG. 4.

Referring to FIGS. 4 and 6, one example backflow device is a flapper valve 122 with a generally flat piece of plastic material sufficiently resilient to permit the flavor enhancing ingredient 14 to flow out of the openings 44. The valve 122 also is sized to cover the openings 44 and be retained by the proximal end surface 124 of the grinder 16 when liquid presses against the valve 122 in an upstream direction. Such a valve 122 may be generally annular to cover one or more of the openings 44.

Figure 7:
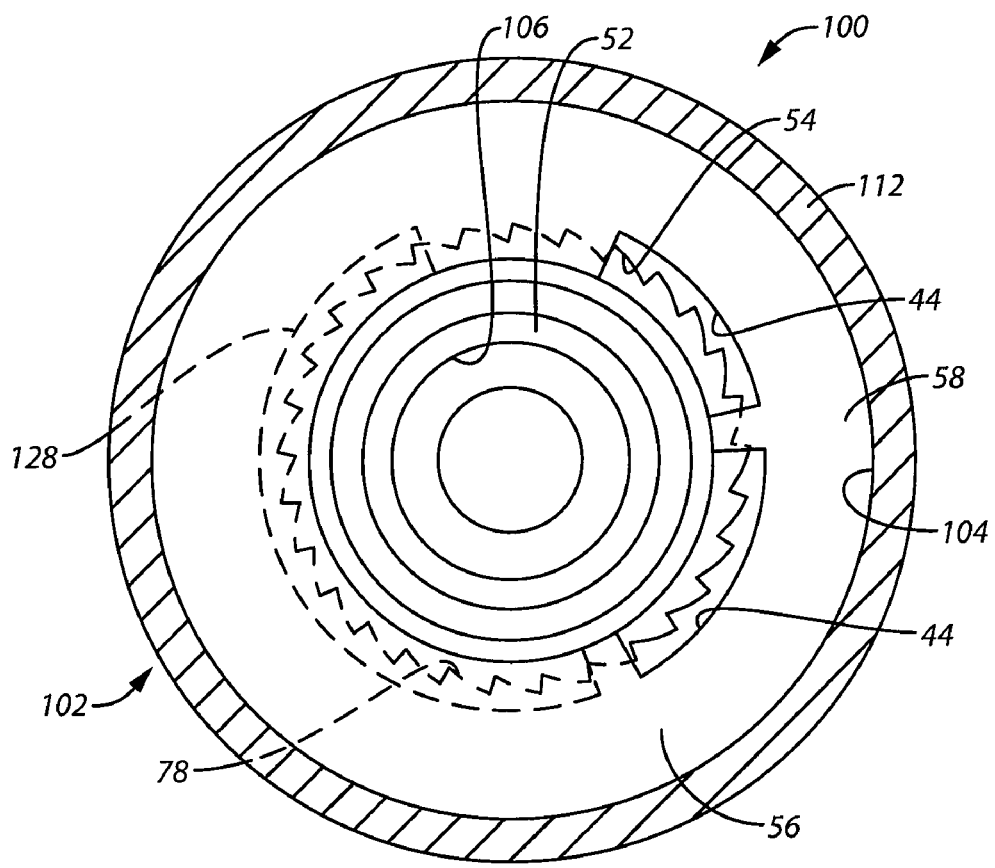
FIG. 7 is a transverse cross-sectional view of an alternative end structure for the dispensing end of FIG. 4 and taken along line VII-VII on FIG. 4.
Figure 8:
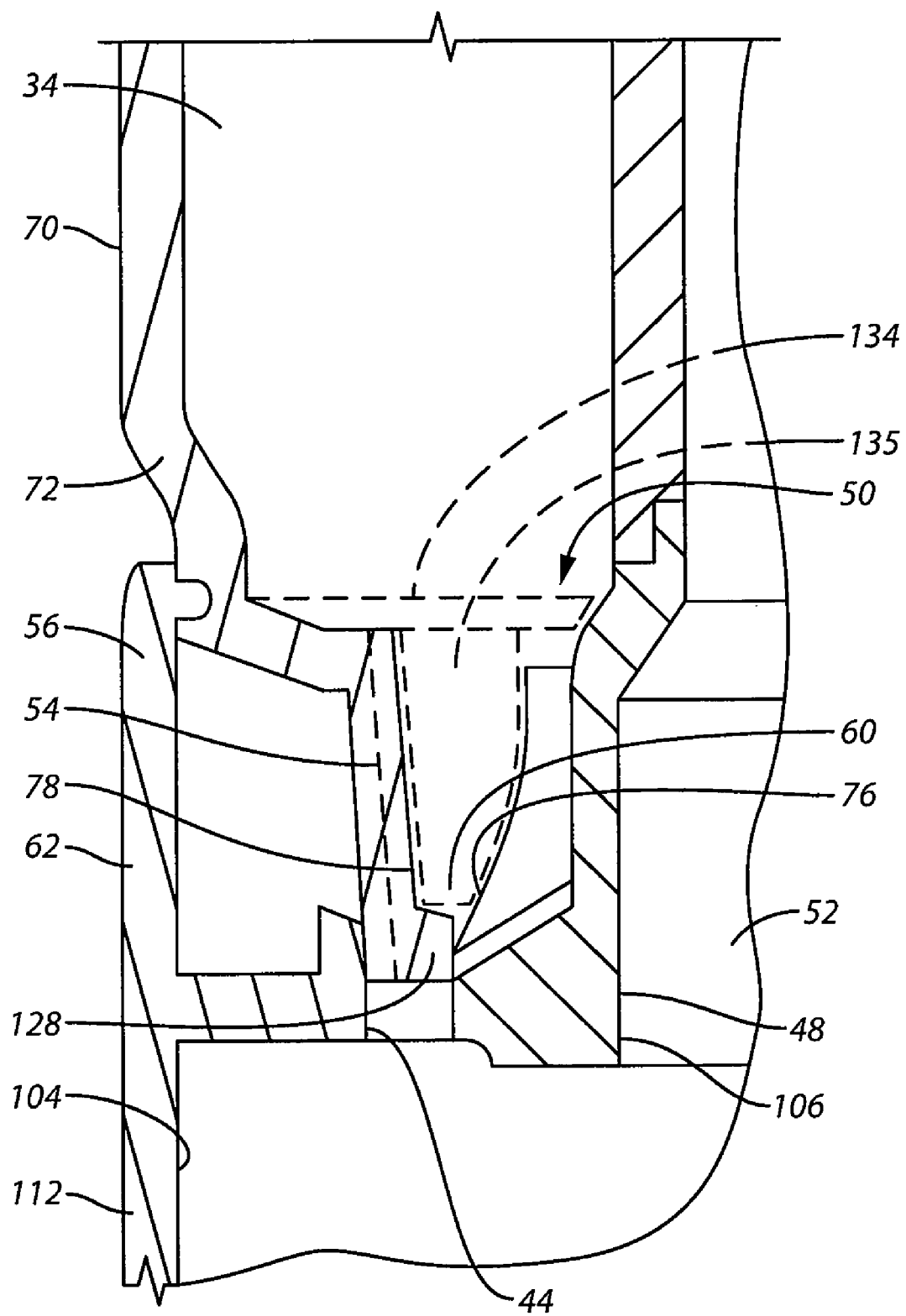
FIG. 8 is a close-up view of a portion of the dispensing end of FIG. 4 modified with the alternative end structure shown in FIG. 7.

Referring to FIGS. 7-8, an alternative backflow device 126 has the plate section 58 of the grinder 16 with only about half of its circumference defining one or more openings 44, while about half of its circumference of the outer portion 54 of the grinder 16 has a thickened end portion 128 to entirely close the openings 44 when the main grinder member 56, and in turn the openings 44, are rotated to a position directly underneath the thickened end portion 128. This closed position can be indicated to the user by indicia 130 and 132 respectively on the outside of the collar 34 and mixing chamber 104 as shown on FIG. 5. In the illustrated example, when the two indicia 130 and 132 align, the grinder 16 is in a closed state. This will restrict the liquid 12 from the mixing chamber 104 from entering the openings 44, engaging the grinder teeth 76 and 78 (shown best on FIG. 3), and jamming the grinder 16. In this case, the grinder 16 may also have a blocking wall 134 (shown in dashed line) so the flavor enhancing ingredient 14 does not normally enter between the inner and outer portions 52 and 54 of the grinder 16 where the thickened end portion 128 extends. Sidewalls 135 (shown in dashed line) may also extend from wall 134 and toward the space 60 between the teeth 76, 78 to further block ingredients 14 from entering underneath blocking wall 134. It should be noted that the backflow devices described here, or any other similar device to control flow through the openings 44, may be provided whether or not the mixing chamber 104 is present, and may be provided on any of the containers disclosed herein.

The indicia may indicate the amount of rotation of the grinder rim 62. Thus, the indicia may include measurement lines and/or text such as ¼, ½, ¾, and so forth. The indicia may also include an arrow to show a preferred or required direction for rotating the grinder rim 62 as needed for the grinder 16.

Figure 9:
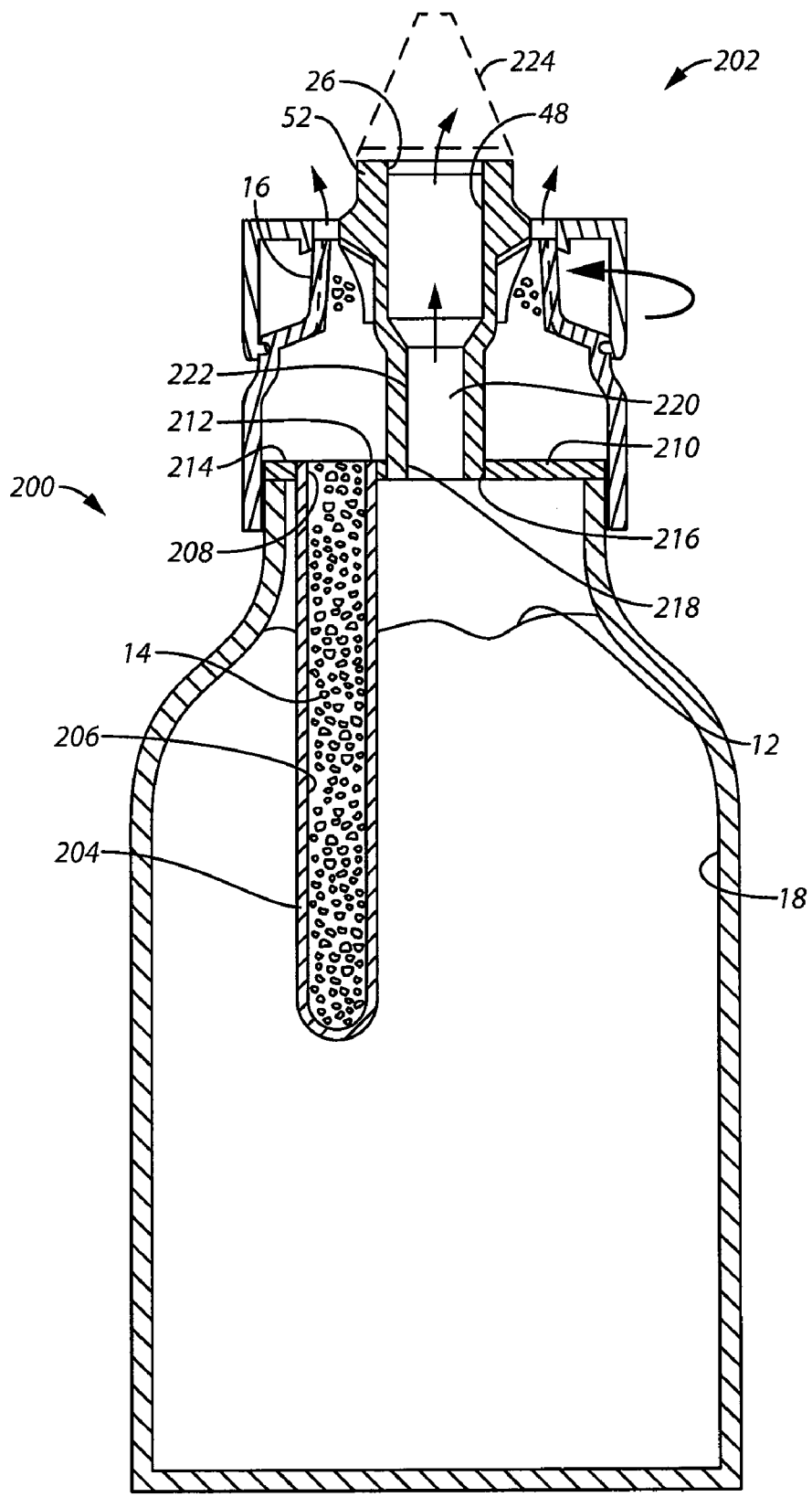
FIG. 9 is a side cross-sectional view of another alternative container and dispensing end.

Referring to FIG. 9, a container 200 has a dispensing end portion 202 similar to that on container 10. Thus, the features of container 200 that are similar to those of container 10 are numbered similarly and need not be redescribed. Container 200 has a grinder 16 similar to that on container 10 for dispensing the liquid 12 and flavor enhancing ingredient 14 separately. Here, however, the container 200 has at least one body 204 defining an ingredient chamber 206 to hold the flavor enhancing ingredient 14. The body 204 is disposed within, or at least extends into, the storage chamber 18, and is made of a hard plastic although the body 204 may be made of many other materials such as a glass. In one form, the plastic is transparent.

In one form, the body 202 is test tube shaped and has an open end portion 208. A dividing wall 210 separates the grinder 16 from the storage chamber 18, and defines at least one aperture 212 for receiving the flavor enhancing ingredients 14 from the body 202. In one form, the open end portion 208 of the body 204 is fixed within the aperture 212 by friction-fit, fasteners, adhesives, welding, or other connection mechanisms. The aperture 212 is near to the outer edge 214 of the dividing wall 210 to provide space for a generally central hole 216 defined by the dividing wall 210. The hole 216 forms a storage chamber outlet 218 therein that communicates with a pathway 220 formed by a tube 222 similar to tube 38. The tube 222 is connected to the bypass passage 48 of the grinder 16 and, in one form, is fixed to the hub 52 to rotate with the hub 52 and within hole 216 as the grinder 16 is operated.

In one form, both the storage chamber 18 and the ingredient chamber 206 are sufficiently transparent or translucent to observe the amount of flavor enhancing ingredient within the body 204. This may permit the user to determine the amount and kind of ingredient 14 in the container 200.

In another aspect, the container 200 has a threaded cone cap 224 (shown in dashed line) for opening and closing the container outlet 26.

Figure 10:
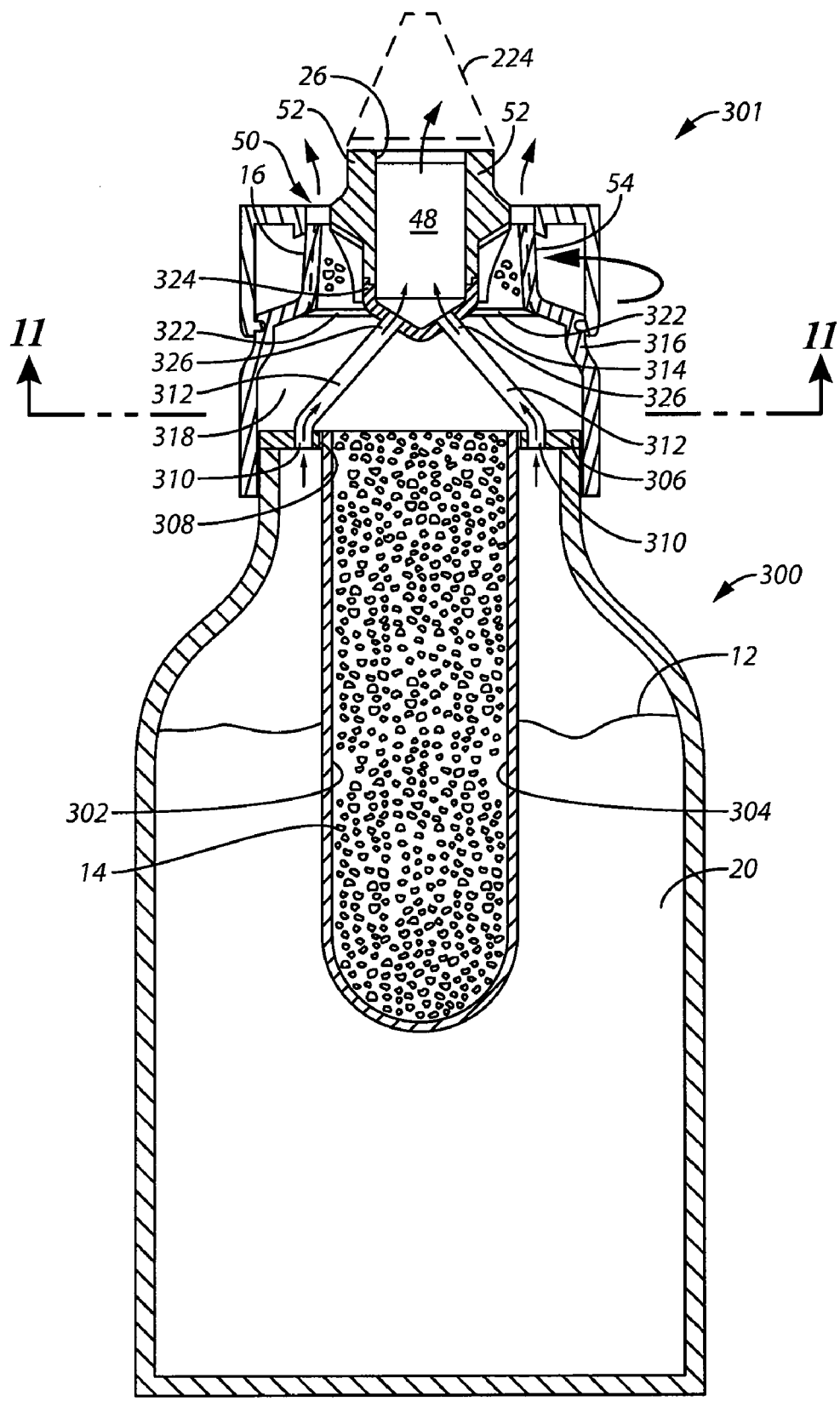
FIG. 10 is a side cross-sectional view of yet another alternative container and dispensing end.
Figure 11:
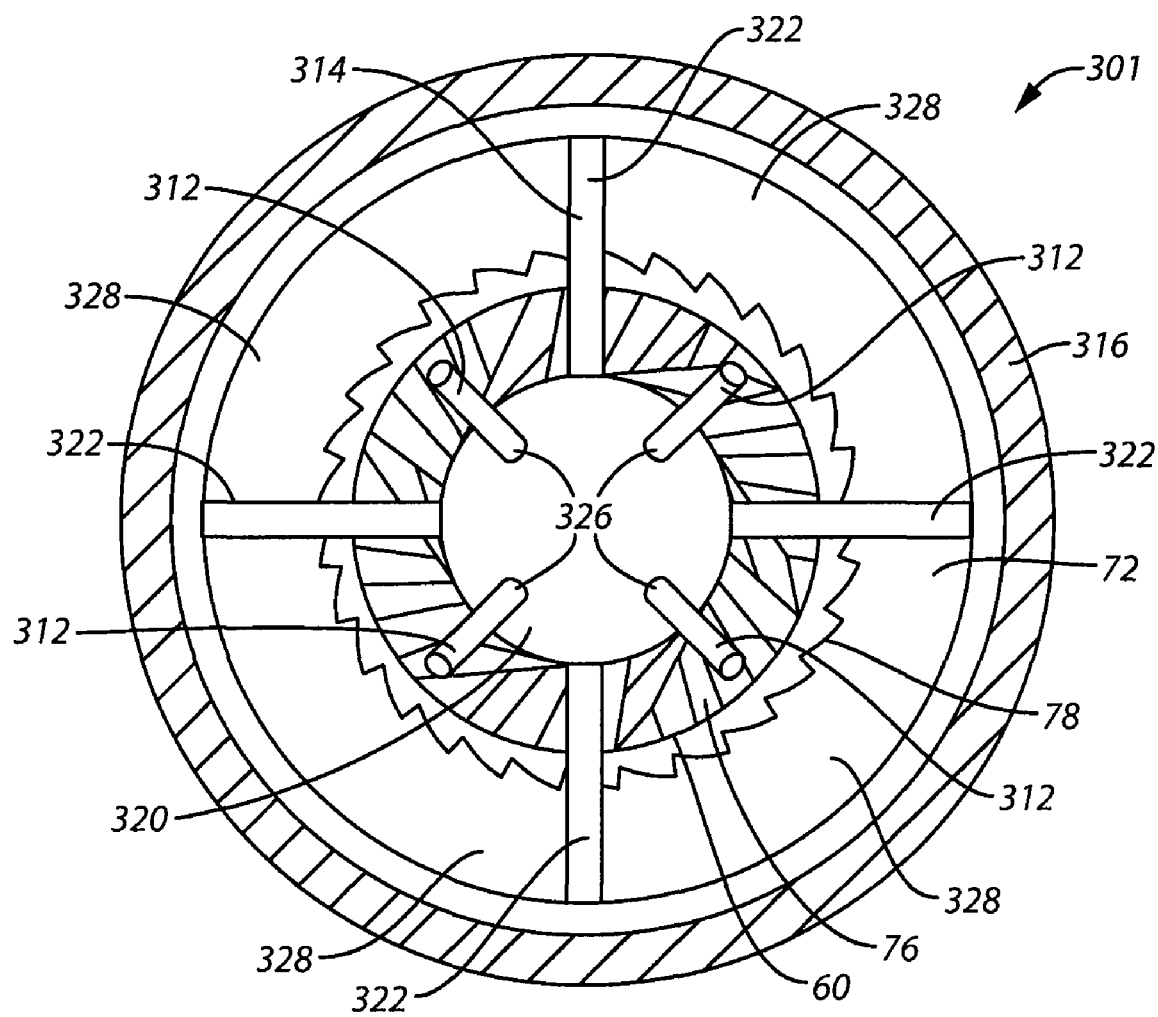
FIG. 11 is a transverse cross-sectional view of the dispensing end of FIG. 10 and taken along line 11-11 on FIG. 10.

Referring to FIGS. 10-11, a container 300 has similar features to that of containers 10 and 200 and are numbered accordingly. Similar to container 200, container 300 has a body 302 that forms an ingredient chamber 304 hanging from a dividing wall 306 and within the storage chamber 18. In this form, however, the dividing wall 306 defines a central aperture 308 for connecting to the body 302 and receiving the flavor enhancing ingredient 14, while the dividing wall 306 also defines at least one storage chamber outlet 310 disposed radially outward from the aperture 308. However, the grinder 16 on the container 300 still defines a generally centrally located bypass passage 48 for conveying the liquid 12 from one side of the grinder to the other, while a grinding portion 50 is disposed radially outward from the bypass passage 48 to receive the flavor enhancing ingredients 14.

In order to direct the liquid 12 from the storage chamber outlets 310 and radially inward to the bypass passage 48, the container 300 has a dispensing end portion 301 with at least one tube 312 extending from the at least one outlet 310 and extending radially inward as the tube extends toward the bypass passage 48. In the illustrated form, four outlets 310 and four corresponding tubes 312 are provided although more or less may be provided instead. The tubes 312 are held near the bypass passage 48 by a tube support 314.

The tube support 314 extends radially inward from a collar 316 connected to an outer portion 54 of the grinder 16 similar to collar 34. The collar 316 is mounted between the storage chamber 18 and the dividing wall 306 on one side and the grinder 16 on the other. The collar 316 covers a space 318 that receives the flavor enhancing ingredient from the body 302, and the tubes 312 crossing from the storage chamber outlets 310 to the bypass passage 48. The collar 316 also covers the tube support 314.

The tube support 314 includes a hub portion 320 supported by spokes 322 that extend from the hub portion 320 to the collar 316. The hub portion 320 is held at a distal end 324 of the hub 52 and over the bypass passage 48. The hub portion 320 is connected to the tubes 312 and configured to hold the tubes 310 to direct the liquid 12 from the tubes 32 into the bypass passage 48. The hub portion 320 is inclined inwardly as it extends toward the storage chamber 18 so that it is generally pyramid shaped to both direct flavor enhancing ingredient 14 outward toward the grinding portion 50 and to form a less sharp angle relative to the outlet ends 326 of the tubes 312 for connection thereto. With this configuration, the spokes 322 define spaces 328 therebetween to permit the flavor enhancing ingredient 14 access to the grinder 16 from the body 302. The inner portion or hub 52 of the grinder 16 may be rotatably connected to the hub portion 320 by a lip and groove connection described previously, or the hub portion 320 may be connected to the distal end 324 of the on the hub portion 320 by other substantially liquid tight mechanisms as long as the hub portion 320 remains fixed with the tubes 312 over the bypass passage 48 while the hub 52 of the grinder 16 is free to rotate.

Figure 12:
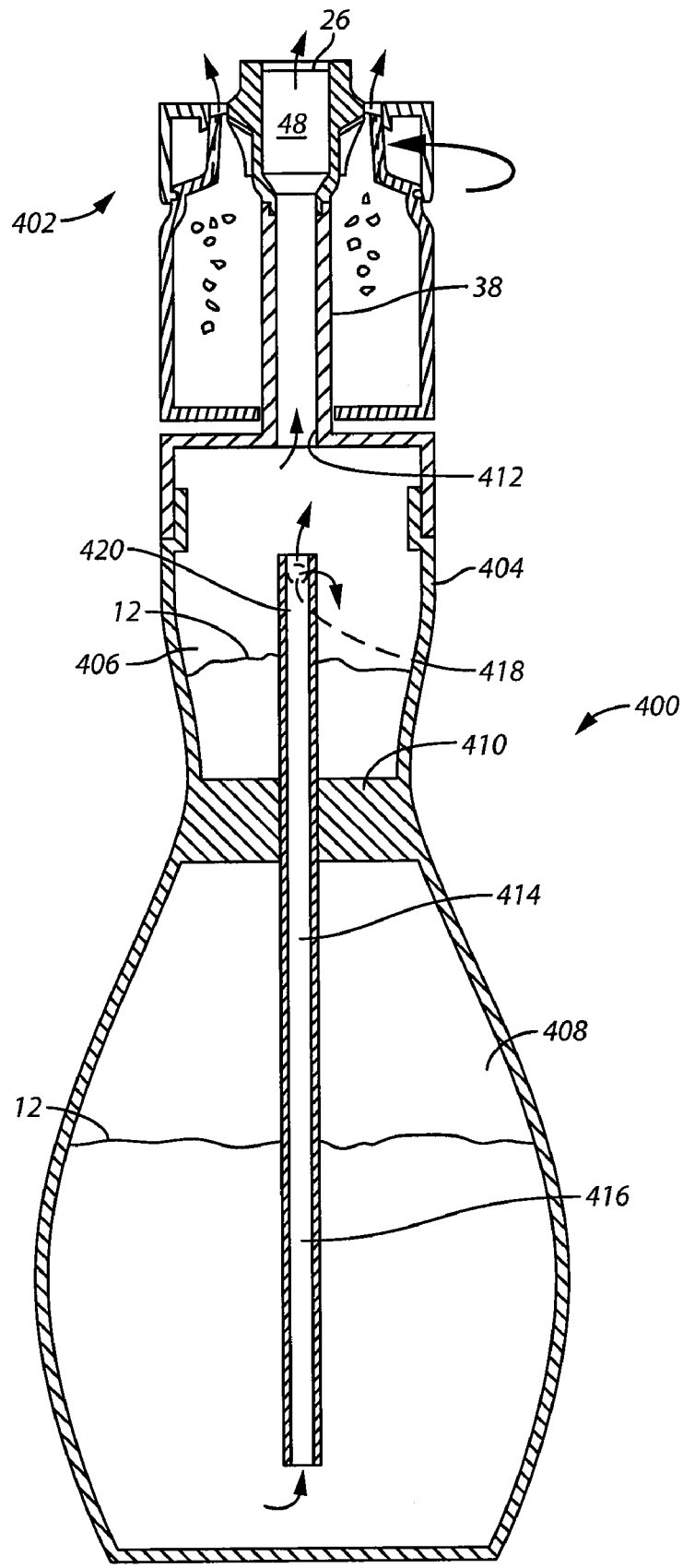
FIG. 12 is a side cross-sectional view of another alternative container and dispensing end.

Referring to FIG. 12, a container 400 has a dispensing end portion 402 with the same or similar structure as the dispensing end portion 28 on container 10. Here, however, a main body portion 404 forms both a serving portion chamber 406 and a storage chamber 408 separated from the serving portion chamber 406 by a separating wall 410. The serving portion chamber 406 has a volume to hold a single serving size of the liquid 12, such as 2 tbsp or 15-30 ml in the case of salad dressing, so that it is easier for the user to pour a single serving size of the liquid.

The serving portion chamber 406 has an outlet 412 that communicates with the tube 38 as does the storage chamber outlet 26 on container 10. The container 400 also has a passage 414 from the storage chamber 408 to the single serving portion chamber 406. In one example, the passage is in the form of a straw 416 that extends though the separating wall 410. The straw 416 has an outlet end 420 that may either open upward or include sidewall openings 418 to direct the liquid radially to more evenly fill the serving portion chamber 406.

In use, pressure is applied to the storage chamber 408 which forces liquid 12 through the passage 414 and into the single serving chamber 406. In one form, the container 400 is sufficiently transparent or translucent so that the user can observe when the single serving chamber 406 is full. Once filled, the container 400 can be inverted to dispense the liquid 12 from the single serving chamber 406 through the storage chamber outlet 412, tube 38, and container outlet 26. The flavor enhancing ingredient 14 may be dispensed as described above for container 10.

Figure 13:
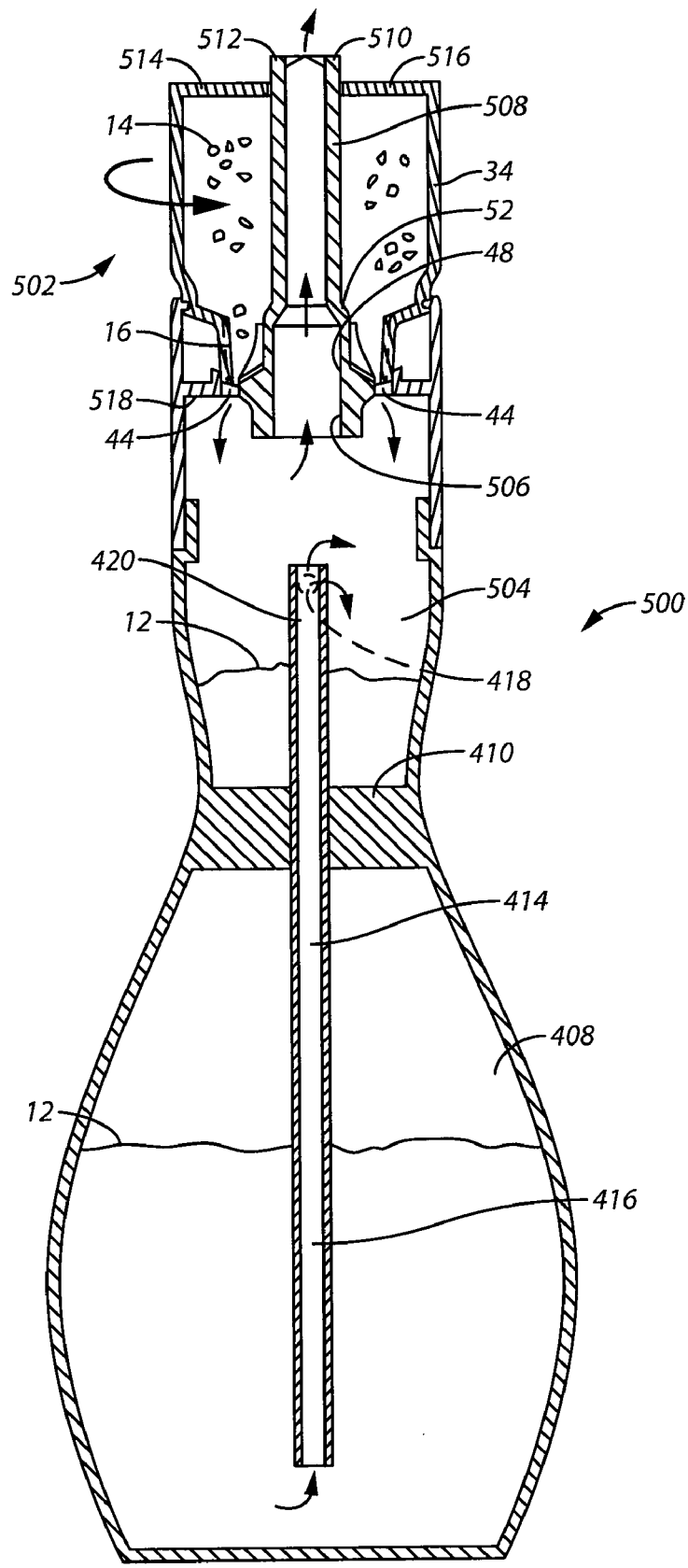
FIG. 13 is a side cross-sectional view of yet another alternative container and dispensing end.

Referring to FIG. 13, a container 500 has a dispensing end portion 502 similar to that on container 10. Container 500 also is provided with a single serving chamber 504 separate from a storage chamber 408 the same or similar to the structure of container 400 but that also performs as a mixing chamber 504 the same or similar to mixing chamber 104 on container 100. Thus, the operation of the grinder 16 and mixing chamber 504 is the same as that for container 100 except here the grinder 16 is disposed on the same side of the mixing chamber 504 as the mixing chamber outlet 506.

In this case, the outlet 418 of the storage chamber 408 is at the straw 416 within the single serving mixing chamber 504. The openings 44 of the grinder 16 are now on the opposite side 318 of the mixing chamber 504 from the storage chamber 408 but still drop ground flavor enhancing ingredient 14 into the mixing chamber 504 when the grinder 16 is operated and while the container 500 is held upright.

Once the liquid 12 and ingredient 14 are within the mixing chamber 504, the container 500 may be shaken to mix the two together as also explained above for mixing chamber 104. Once mixed, the container 500 may be inverted to direct the mixture through the mixing chamber outlet 506, through bypass passage 48 of the grinder 16, and into a tube 508, similar to tube 38. Tube 508 is fixed to the hub 52 of the grinder 16 and has a proximal end 510 that forms the container outlet 512 for the container 500. In this form, the collar 34 has a proximal wall 514 that forms the proximal end 516 of the container 500. The collar 34 and proximal end 516 both rotate about the tube 508 to operate the grinder 16. Alternatively, tube 508 could be fixed relative to proximal wall 514 and be rotatable relative to the grinder hub 52.

It will be appreciated that the grinder and ingredient chamber for any of the containers shown herein may be sold together as an integral unit or assembly separate from a container body or bottle forming the storage chamber for the liquid. Thus, the grinder may be packaged with one of a variety of different flavor enhancing ingredients that can be attached to a bottle of base liquid, such as a dressing sold separately. In one form, the unit or assembly is configured to attach to a standard container or bottle size. Such standard containers may provide different liquids for further customization by the consumer. The integral unit or assembly may be refillable with the ingredient or replacement units or assemblies may be required instead.

It will be further appreciated that the foregoing containers may also apply to non-edible items when it is desirable to grind a selected amount of one ingredient and mix it with a liquid ingredient. This may occur in cosmetics, for example, where particulates of a colorant or other additive may be ground before mixing it with a liquid material to form custom makeup or exfoliating cream, for example.

From the foregoing, it will be appreciated that containers with grinders and methods of use are disclosed herein that provide for advantages mentioned above. However, the disclosure is not limited to the aspects and embodiments described hereinabove, or to any particular embodiments.

What is claimed is:

1. A container for holding an edible liquid, the container comprising:
    a storage chamber for holding the liquid and having at least one outlet;
    an ingredient chamber separate from the storage chamber and for holding a flavor enhancing ingredient; and
    a grinder communicating with the ingredient chamber for grinding the flavor enhancing ingredient and having at least one opening for dispensing the flavor enhancing ingredient on a downstream side of the grinder different from that of the ingredient chamber;
    wherein the grinder defines a bypass passage for conveying the liquid from one side of the grinder to the downstream side of the grinder.

2. The container of claim 1 wherein the grinder comprises an inner portion defining the bypass passage and an outer portion mounted at least partially around the inner portion, and wherein the flavor enhancing ingredient is received between the inner and outer portions.

3. The container of claim 1 wherein the ingredient chamber is fixed relative to the outer portion.

4. The container of claim 1 wherein the container further comprises a pathway at least partially directing the liquid to the bypass passage, and a collar mounted around the pathway and forming the ingredient chamber.

5. The container of claim 4 wherein the collar rotates about the pathway, and the pathway is at least one of:
    fixed relative to the inner portion so that the pathway rotates with the inner portion, and rotatably connected to the inner portion.

6. The container of claim 1 further comprising a container outlet communicating with the storage outlet for dispensing the liquid from the container separately from the flavor enhancing ingredient.

7. The container of claim 1 further comprising:
    a first end portion; and
    a second end portion opposite the first end portion, the first and second end portions being configured so that dispensing of both the liquid and the flavor enhancing ingredient to an exterior of the container occurs on the same one of the first and second end portions.

8. The container of claim 1 wherein the grinder has a rotatable portion rotatable to cause the grinding.

9. A container for holding an edible liquid, the container comprising:
- a storage chamber for holding the liquid and having at least one outlet;
- an ingredient chamber separate from the storage chamber and for holding a flavor enhancing ingredient; and
- a grinder communicating with the ingredient chamber for grinding the flavor enhancing ingredient and having at least one opening for dispensing the flavor enhancing ingredient on a downstream side of the grinder different from that of the ingredient chamber; and
- a container outlet communicating with the storage chamber outlet for dispensing the liquid exteriorly of the container, and wherein the at least one opening is radially and outwardly spaced from the container outlet.

10. A container for holding an edible liquid, the container comprising:
- a storage chamber for holding the liquid and having at least one outlet;
- an ingredient chamber separate from the storage chamber and for holding a flavor enhancing ingredient; and
- a grinder communicating with the ingredient chamber for grinding the flavor enhancing ingredient and having at least one opening for dispensing the flavor enhancing ingredient on a downstream side of the grinder different from that of the ingredient chamber; and
- a mixing chamber for receiving both liquid from the outlet and flavor enhancing ingredient from the opening, and comprising a mixing chamber outlet for dispensing the mixed liquid and flavor enhancing ingredient.

11. The container of claim 10 wherein the grinder is disposed on a different side of the mixing chamber from the mixing chamber outlet.

12. The container of claim 10 wherein the grinder is disposed on the same side of the mixing chamber as the mixing chamber outlet.

13. The container of claim 10 wherein the grinder is configured to permit a selected amount of flavor enhancing ingredient to be placed in the mixing chamber that is less than all of the flavor enhancing ingredients in the ingredient chamber.

14. The container of claim 1 further comprising means for restricting liquid downstream of the opening to the grinder from entering the opening, and movable to permit the flavor enhancing ingredient to flow out of the opening.

15. A container for holding an edible liquid, the container comprising:
- a storage chamber for holding the liquid and having at least one outlet;
- an ingredient chamber separate from the storage chamber and for holding a flavor enhancing ingredient; and
- a grinder communicating with the ingredient chamber for grinding the flavor enhancing ingredient and having at least one opening for dispensing the flavor enhancing ingredient on a downstream side of the grinder different from that of the ingredient chamber; and
- a serving portion chamber separate from the storage chamber and configured to hold a single serving size of the liquid, and the container further comprising a passage from the storage chamber to the single serving portion chamber, the passage being configured so that applying pressure to the storage chamber forces liquid through the passage.

16. A container for holding an edible liquid, the container comprising:
- a storage chamber for holding the liquid and having at least one outlet;
- an ingredient chamber separate from the storage chamber and for holding a flavor enhancing ingredient; and
- a grinder communicating with the ingredient chamber for grinding the flavor enhancing ingredient and having at least one opening for dispensing the flavor enhancing ingredient on a downstream side of the grinder different from that of the ingredient chamber; and
- wherein the ingredient chamber comprises a body holding the flavor enhancing ingredient and being disposed within the storage chamber.

17. The container of claim 16 further comprising a dividing wall for forming a space separating the grinder from the storage chamber, defining at least one outlet of the storage chamber, and defining at least one aperture for receiving the flavor enhancing ingredient through the at least one aperture at a position radially inward from the at least one outlet on the wall, and wherein the grinder comprises a bypass passage for conveying the liquid from one side of the grinder to the other, and a grinding portion receiving the flavor enhancing ingredients disposed radially outward from the bypass passage.

18. The container of claim 17 further comprising:
- a collar mounted between the storage chamber and the grinder; and
- a tube support extending inwardly from the collar and comprising a hub with spokes connected to the collar, wherein the hub is configured to communicate the at least one tube with the bypass passage, and wherein the spokes define spaces therebetween to permit the flavor enhancing ingredient access to the grinder from the body,
- wherein the grinder comprises an inner portion defining the bypass passage and being rotatably connected to the hub.

19. A container for holding an edible liquid, the container comprising:
- a storage chamber for holding the liquid and having at least one outlet;
- an ingredient chamber separate from the storage chamber and for holding a flavor enhancing ingredient; and
- a grinder communicating with the ingredient chamber for grinding the flavor enhancing ingredient and having at least one opening for dispensing the flavor enhancing ingredient on a downstream side of the grinder different from that of the ingredient chamber; and
- wherein the at least one outlet of the storage chamber and the at least one opening of the grinder are configured such that the liquid and the flavor enhancing ingredient can be dispensed simultaneously.

* * * * *